J. N. VANDEGRIFT.
ROLLER BEARING.
APPLICATION FILED JULY 29, 1910.

1,331,686.

Patented Feb. 24, 1920.

WITNESSES:

INVENTOR
James N. Vandegrift
BY
ATTORNEYS

UNITED STATES PATENT OFFICE.

JAMES N. VANDEGRIFT, OF SYRACUSE, NEW YORK, ASSIGNOR TO RAILWAY ROLLER BEARING COMPANY, OF SYRACUSE, NEW YORK, A CORPORATION OF NEW YORK.

ROLLER-BEARING.

1,331,686.   Specification of Letters Patent.   Patented Feb. 24, 1920.

Application filed July 29, 1910. Serial No. 574,557.

*To all whom it may concern:*

Be it known that I, JAMES N. VANDEGRIFT, of Syracuse, in the county of Onondaga and State of New York, have invented a certain new and useful Roller-Bearing, of which the following is a specification.

My invention has for its object the production of a roller bearing and relates particularly to means whereby the rollers are relieved of all end thrust and diagonal strains; and the invention consists in the combinations and constructions hereinafter set forth and claimed.

In describing this invention reference is had to the accompanying drawing in which like characters designate corresponding parts in all the views.

Figure 1:
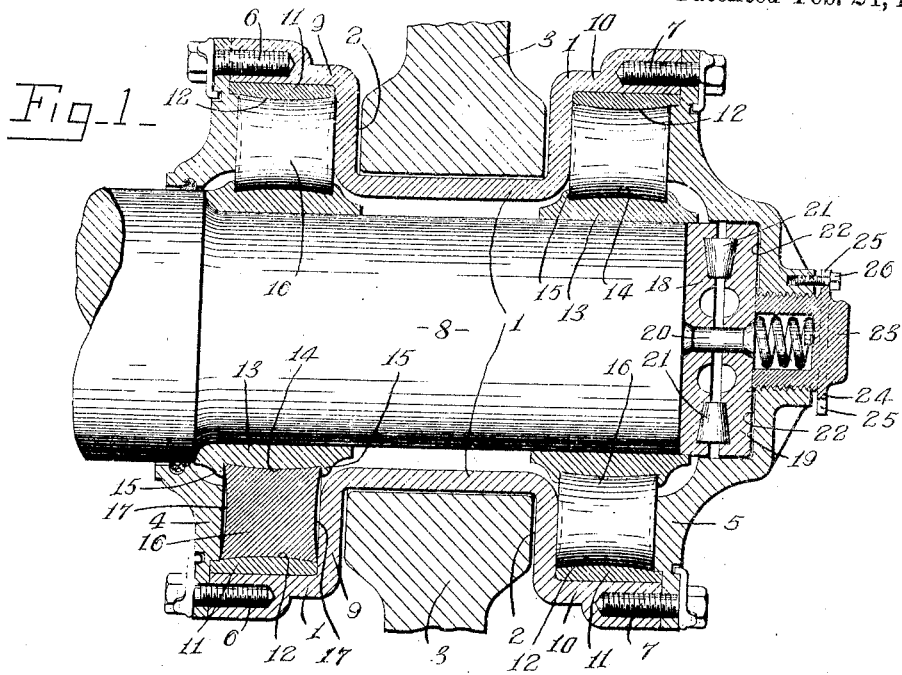
Figure 1 is a horizontal sectional view of this roller bearing, contiguous parts of the axle and the jaws of a truck frame being also shown.
Figure 2:
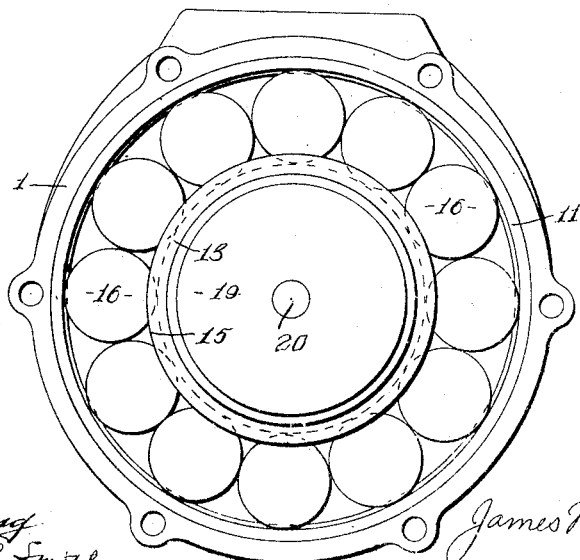
Fig. 2 is an end view of the parts seen in Fig. 1, the cover at the outer end of the box being removed.

1 is the journal box having external channels 2 for receiving the jaws 3 of the truck frame. The box is also formed with detachable ends or covers 4 and 5 held in position by cap screws 6 and 7, and with an axle opening extending through the inner cover 4 and through which the axle 8 extends. The journal box is also formed with internal annular channels 9 and 10 at its ends, the covers 4 and 5 forming sides of such channels. The channels are provided with bearing faces therein concentric with the axis of the axle opening and preferably rings 11 are inserted into the channels and the inner faces 12 of such rings are usually convexly curved in cross-section and serve as bearing faces for the rollers presently described. 13 are sleeves or rings encircling the axle near the ends of the journal box and having bearing faces 14 convexly curved in cross-section and opposed to the faces 12, said rings 13 also having flanges 15 at the sides of the convex bearing faces 14. Usually the sleeves are slidable axially of the axle for the purpose hereinafter explained.

16 are the rollers arranged in annular series in the channels 9 and 10, each roller being formed with a concavely curved periphery extending from end to end of the roller and engaging the convexly curved bearing faces 12 and 14. The ends of the rollers are recessed as indicated at 17 in order that the ends of the rollers will engage only near the peripheries of the rollers, with the sides of the channels 9 and 10 and with the flanges 15 of the rings 13. The rings 13 constitute means associated with the axle and having convexly curved bearing faces for engaging the concave faces of the rollers.

The cover 5 at the outer end of the box supports an end thrust bearing for engaging the end of the axle 8 and the axle is provided with means for holding the end thrust bearing concentric therewith at all times. As here shown the end thrust bearing consists of two plates 18 and 19 secured together by a central fastening member 20 and antifriction members as conical rollers 21 arranged in raceways formed in the opposing faces of the plates 18 and 19. Said plates 18 and 19 are arranged in a socket 22 formed in the cover 5, the socket being of larger diameter than the plates in order to allow a limited movement of the plates. The end thrust bearing is held concentric with the axle 8 by means of an axial socket formed at the end of the axle and into which a portion of the plate 18 extends, the plate 18 fitting the socket so that during any lateral movement or play of the axle the end thrust bearing shifts therewith. As here illustrated said socket is formed by one of the bearing rings or sleeves 13 extending beyond the end of the axle. The end thrust may be adjusted axially by means of a nut 23 turning in a threaded axial passage in the outer cover 5 of the box and formed with a socket opening through its inner end and in which a compression spring is located for pressing against the plate 19. The head of the nut is formed with a flange 24 having peripheral notches 25, any one of which is adapted to receive a locking screw 26 which threads into a suitable opening in the cover.

It will be apparent that the end thrust bearings at the opposite ends of the axle preventing inward movement of the box, and the inner face of the jaws of the truck frame bearing on the box preventing its outward movement, hold the box and its contents from axial movement and maintain the bearing parts in fixed position, and thus the rollers are relieved of the end thrust and have merely a radial action.

Furthermore the end thrust bearing engaging the axle and the curved convex bearing faces of the box and of the axially movable ring on the axle engaging the rollers coact and insure that the rollers will always maintain a position in which their axes are always parallel to the axis of the box and the axle, especially when the box receives strains in a diagonal direction.

What I claim is:—

1. The combination with an axle, of a roller bearing comprising a box having an axle opening, and an annular channel concentric with the axle opening, the sides of the channel being closed, and the channel having a circumferential bearing face therein, means associated with the axle and having a bearing face opposed to the former bearing face, and an annular series of rollers in the channel, each roller being independent of the other rollers and being of large diameter compared with its length and having its ends recessed, the edges of such recessed ends coacting with the sides of the channel, substantially as and for the purpose described.

2. The combination with an axle, of a roller bearing comprising a box having an axle opening and an annular channel concentric with the axis of the axle opening, the sides of the channel being closed and the channel having a circumferential bearing face therein convexly curved in cross-section, means associated with the axle and having a bearing face convexly curved in cross-section opposed to the former bearing face, and an annular series of free running rollers in the channel, each roller being independent of the other rollers and having a concavely curved periphery extending from end to end of the roller and engaging the convex bearing faces, and the rollers having their ends recessed and coacting with the sides of the channel, substantially as and for the purpose set forth.

In testimony whereof, I have hereunto signed my name in the presence of two attesting witnesses, at Syracuse, in the county of Onondaga, in the State of New York, this 2nd day of June 1910.

JAMES N. VANDEGRIFT.

Witnesses:
  S. DAVIS,
  F. B. SMITH.